US006598469B2

(12) United States Patent
Shimoyama et al.

(10) Patent No.: US 6,598,469 B2
(45) Date of Patent: Jul. 29, 2003

(54) METHOD AND APPARATUS FOR DETECTING OPERATING STATE OF INTERNAL COMBUSTION ENGINES

(75) Inventors: Akira Shimoyama, Numazu (JP); Kazuyoshi Kishibata, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 10/072,769

(22) Filed: Feb. 8, 2002

(65) Prior Publication Data

US 2002/0112536 A1 Aug. 22, 2002

(30) Foreign Application Priority Data

Feb. 15, 2001 (JP) ...................................... 2001-038072

(51) Int. Cl.[7] ............................................... G01M 15/00
(52) U.S. Cl. ...................................... 73/117.3; 73/117.3
(58) Field of Search ................................ 123/425, 478, 123/479, 686, 688, 690, 691, 436, 493, 475, 492; 73/117.3, 117.2, 116

(56) References Cited

U.S. PATENT DOCUMENTS 4,640,249 A * 2/1987 Kawamura et al. ......... 123/425
5,284,118 A 2/1994 Kato et al.
5,319,558 A 6/1994 Nemoto et al.
5,522,366 A 6/1996 Konno et al.

* cited by examiner

*Primary Examiner*—Kamand Cuneo
*Assistant Examiner*—Monica D. Harrison
(74) *Attorney, Agent, or Firm*—Pearne & Gordon LLP

(57) ABSTRACT

An operating state detecting method for an internal combustion engine for detecting whether the engine is in an accelerating state and/or whether it is in a decelerating state without detecting the opening degree of a throttle valve is to be provided. A plurality of rotational angle positions of a crankshaft of an internal combustion engine are specified as sampling positions, and pressures within an air intake pipe sampled at each sampling position are stored. Every time a pressure within the air intake pipe is sampled at each sampling position, the newly sampled pressure within the air intake pipe is compared with a previous pressure within the air intake pipe sampled at the same sampling position one combustion cycle before, and whether the engine is in an accelerating state and/or whether it is in a decelerating state is determined from the result of comparison.

6 Claims, 5 Drawing Sheets

Fig.5A
Fig.5B
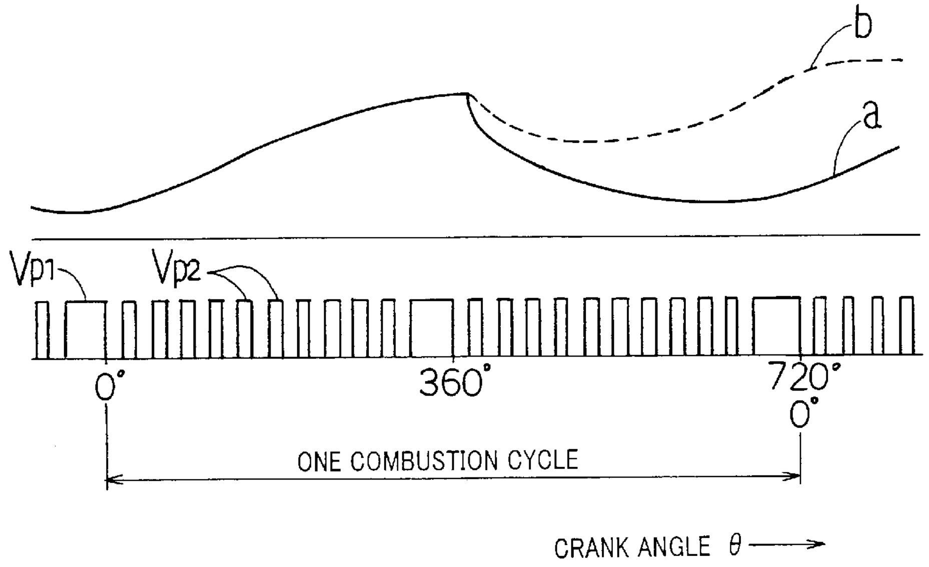
Fig.6
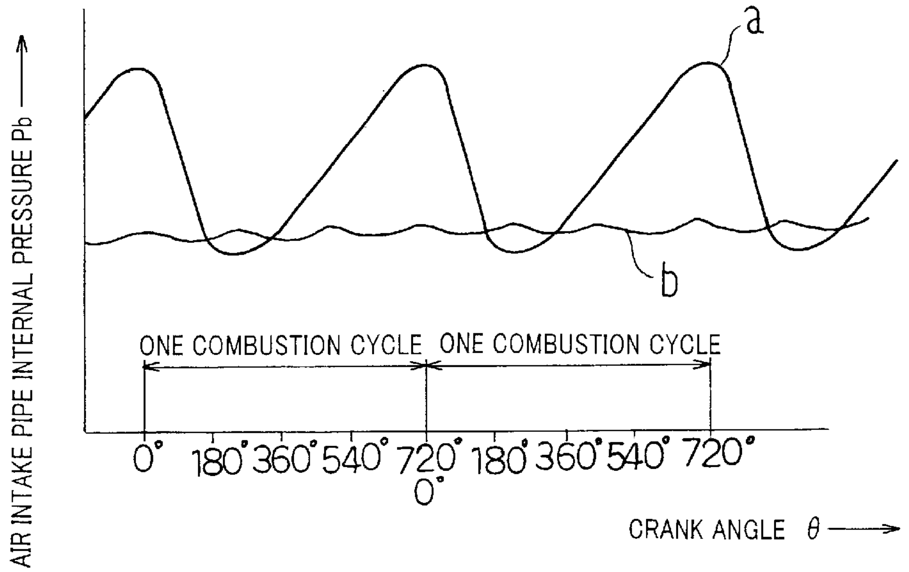

METHOD AND APPARATUS FOR DETECTING OPERATING STATE OF INTERNAL COMBUSTION ENGINES

TECHNICAL FIELD OF THE INVENTION

The present invention relates to an operating state detecting method for internal combustion engines for determining whether an internal combustion engine is being accelerated and/or whether it is being decelerated, and an operating state detecting apparatus for implementing this detecting method.

BACKGROUND OF THE INVENTION

In controlling an internal combustion engine, it is often necessary to determine whether the engine is being accelerated or decelerated. For instance, where an electronic fuel injection (EFI) device is used for feeding fuel to an internal combustion engine, it is determined whether the engine is being accelerated or decelerated, and the finding is taken into consideration in determining the quantity of fuel to be injected.

The EFI device is comprised of an electromagnetic fuel injection valve (injector) for injecting fuel into an air intake pipe or a cylinder of the engine, a fuel pump for feeding fuel to the injector, a pressure regulator for keeping the pressure of fuel fed to the injector substantially constant, and an electronic control unit (ECU) for controlling the injector so that it may inject a predetermined quantity of fuel when the internal combustion engine is at a predetermined position of rotational angle.

The ECU, provided with injection quantity operating means for arithmetically operating the fuel injection quantity on the basis of various control conditions such as the atmospheric pressure and the engine temperature and a drive circuit for supplying a drive signal to the injector so that the injector injects the arithmetically operated quantity of fuel, controls the injector so that a mixture in a predetermined air/fuel ratio is supplied into each cylinder of the engine according to various control conditions.

In order to determine the quantity of fuel to be injected by the injector, a fuel injection device of this kind needs knowledge of the quantity of air having flowed into each cylinder of the engine. One of known ways to determine the quantity of air having flowed into each cylinder is to estimate it from the (negative) pressure in the air intake pipe and the volume efficiency of the engine.

In an internal combustion engine wherein the fuel injection quantity is determined on the basis of the estimated quantity of air having flowed into each cylinder from the pressure in the air intake pipe and the volume efficiency of the engine, when the engine is being accelerated or decelerated, the air/fuel ratio of the mixture may be made leaner or richer by a delay in response. Thus, when a driver abruptly opens a throttle valve to accelerate the engine, since a delay is occurred by the time that the estimated quantity of air flowing into each cylinder is corrected by means of detecting a pressure variation in the air intake pipe ensuring from the variation in the opening degree of the throttle valve, the quantity of fuel injection arithmetically operated by the ECU tends to be smaller than the quantity of injection actually required by the engine and accordingly the air/fuel mixture becomes too lean. Meanwhile, when the driver abruptly closes the throttle valve to decelerate the engine, a similar delay in response makes the quantity of air/fuel mixture arithmetically operated by the ECU tends to be greater than the quantity of air/fuel mixture actually required by the engine and accordingly the air/fuel mixture becomes too rich. For this reason, if the quantity of fuel injection is controlled with no allowance for the delay in response at the time of accelerating or decelerating the engine, the exhaust gas composition may deteriorate, and so may deteriorate the operating performance of the engine, at the time of accelerating or decelerating the engine.

In order to solve the problem noted above, an electronic fuel injection device may be provided with means for detecting an accelerating state and a decelerating state of an engine and, when either of these states is detected, prevent the exhaust gas composition or the operating performance of the engine from deteriorating at the time of acceleration or deceleration by correcting the quantity of fuel injection arithmetically operated on the basis of the estimated quantity of air flowing into each cylinder and thereby keeping the air/fuel ratio within an appropriate range.

Control taking into account the states of acceleration or deceleration of an engine may be carried out not only when the quantity of fuel injection into the engine is to be controlled but also when, for instance, the ignition timing of the engine is to be controlled to improve the accelerating performance or the exhaust composition of the engine.

A fuel injection device according to the prior art comprises a throttle position sensor to detect the opening degree of the throttle valve. The fuel injection device determines that the engine is being accelerated when the variation of the opening degree of the throttle valve by a predetermined quantity in the accelerating direction in a predetermined length of time is detected and determines that the engine is being decelerated when the variation of the opening degree of the throttle valve by a predetermined quantity in the decelerating direction in a predetermined length of time is detected.

Since the internal combustion engine according to the prior art detects the accelerating state or the deteriorating state of the engine from any variation in the opening degree of the throttle as described above, it requires a throttle position sensor and inevitably a corresponding increase in cost.

SUMMARY OF THE INVENTION

An object of the present invention is to provide an operating state detecting method and apparatus for internal combustion engines whereby it can be determined, without a throttle position sensor, whether an internal combustion engine is being accelerated and/or whether it is being decelerated from any variation in pressure within an air intake pipe.

The present invention provides an operating state detecting method for internal combustion engines for determining whether an internal combustion engine is being accelerated or decelerated. According to the present invention, a plurality of rotational angle positions of a crankshaft of an internal combustion engine are predetermined in advance to be sampling positions for sampling pressures within the air intake pipe of the internal combustion engine, and each pressure within the air intake pipe of the internal combustion engine sampled at each sampling position is stored. Every time each pressure within the air intake pipe is sampled at each sampling position, a newly sampled pressure within the air intake pipe is compared with a previous pressure within the air intake pipe sampled at the same sampling position one combustion cycle before, and whether the internal combustion engine is in an accelerating state and/or whether it is in a decelerating state is determined from the result of comparison.

In one aspect of the invention, the newly sampled pressure within the air intake pipe is compared with the previous pressure within the air intake pipe obtained by sampling at the same sampling position one combustion cycle before, and it is determined that the internal combustion engine is being accelerated when the newly sampled pressure within the air intake pipe is higher by at least a predetermined level than the previously sampled pressure within the air intake pipe and that the internal combustion engine is being decelerated when the newly sampled pressure within the air intake pipe is lower by at least a predetermined level than the previously sampled pressure within the air intake pipe.

As described above, if it is so disposed that the internal combustion engine be determined whether in an accelerating state and/or whether in a decelerating state by specifying in advance a plurality of rotational angle positions of the crankshaft of the internal combustion engine to be sampling positions for sampling the pressure within the air intake pipe of the internal combustion engine and, every time the pressure within the air intake pipe is sampled at a sampling position, comparing the newly sampled pressure within the air intake pipe with the previous pressure within the air intake pipe obtained by sampling at the same sampling position one combustion cycle before, whether the engine is in an accelerating state and/or whether it is in a decelerating state can be detected without having to use a throttle position sensor, which makes possible a reduction in cost.

In determining an accelerating state or a decelerating state from the pressure within the air intake pipe, it is conceivable to compare the pressure within the air intake pipe detected at each sampling position with a predetermined reference level. Since the pressure within the air intake pipe significantly pulsates as the engine proceeds from one stroke to another, it is impossible to accurately detect the accelerating state or the decelerating state by comparing the pressure within the air intake pipe detected at each sampling position with a predetermined reference level. It is also conceivable to eliminate the impact of the pulsation of the pressure within the air intake pipe by integrating pressures within the air intake pipe for one combustion cycle, comparing the result of integration with a predetermined reference level, but by this method the accelerating state or the decelerating state at each rotational angle position of the engine cannot be detected without waiting a full combustion cycle, it is impossible to control the engine on a real time basis according to its operating state at every moment.

On the contrary, if a newly detected (current) pressure within the air intake pipe is compared with the pressure within the air intake pipe one combustion cycle before as described above, it is possible to clearly detect the accelerating state or the decelerating state at every moment without delay even where the pressure within the air intake pipe pulsates significantly as the engine proceeds from one stroke to another.

The invention is applicable to both mono-cylinder internal combustion engines and multi-cylinder internal combustion engines. Where each cylinder of a multi-cylinder internal combustion engine is provided with an air intake pipe, the pressure of any one air intake pipe can be sampled.

In the case that the invention is applied to an internal combustion engine of which one air intake pipe provided with a throttle valve is connected via a surge tank to the air intake ports of a plurality of cylinders, the pressure within the air intake pipe may as well be indirectly detected by sampling the pressure in the surge tank. Although the pulsation of the pressure in the surge tank due to stroke changes of the engine is relatively small, it is not possible to completely eliminate the impact of the pulsation arising from stroke changes of the engine. Therefore, it is useful, even where the pressure within the air intake pipe is to be detected from the pressure in the surge tank, to compare the pressure within the air intake pipe detected at each sampling position with the pressure within the air intake pipe sampled one combustion cycle before as described in the present invention.

Thus, the method according to the invention is useful for multiple purposes because it is applicable to both cases where the pressure within the air intake pipe is to be directly detected and cases where it is to be indirectly detected by way of the pressure within a surge tank.

Thus, an operating state detecting apparatus for internal combustion engines to be used for implementing the detecting method described above comprises a pressure sensor for detecting pressures within an air intake pipe of an internal combustion engine, a rotational angle sensor for generating a rotational angle detection signal for detecting each of the plurality of rotational angle positions of a crankshaft of the internal combustion engine, a pulse generator for generating a reference pulse for detecting a reference rotational angle position of the crankshaft of the internal combustion engine, air intake pipe internal pressure sampling means for sampling, at each of the plurality of rotational angle positions detected from the rotational angle detection signal as sampling positions, the pressure within the air intake pipe detected by the pressure sensor at each sampling position, storage means for identifying the sampling positions with reference to the reference rotational angle position detected by the reference pulses and storing the pressures within the air intake pipe sampled at different sampling positions, and comparative determination means for comparing the pressures within the air intake pipe newly sampled at each sampling position with the pressure within the air intake pipe sampled at the same sampling position one combustion cycle before and stored by the storage means, determining that the internal combustion engine is being accelerated when the newly sampled pressure within the air intake pipe is higher by at least a predetermined level than the previously sampled pressure within the air intake pipe, and determining that the internal combustion engine is being decelerated when the newly sampled pressure within the air intake pipe is lower by at least a predetermined level than the previously sampled pressure within the air intake pipe.

As the rotational angle sensor mentioned above, a power generating coil provided in a multi-polar magnet generator driven by the internal combustion engine and supplying A.C. voltages of a plurality of cycle while the crankshaft of the internal combustion engine completes one revolution can be used. In this case, the air intake pipe internal pressure sampling means is so comprised as to use as the sampling position at least either of a rotational angle position of the crankshaft matching each zero cross point of the A.C. voltages supplied by the power generating coil and a rotational angle position of the crankshaft matching each peak point of the A.C. voltages.

Since the use of the power generating coil in the magnet generator fitted to the internal combustion engine as the rotational angle sensor as described above eliminates the need to provide a rotational angle sensor specially for the purpose, the invention can be implemented without complicating the construction of the internal combustion engine or inviting an increase in cost.

Also as the rotational angle sensor, a signal generating device (encoder) for generating a pulse signal every time the internal combustion engine rotates by a predetermined angle can be used. In this case, the air intake pipe internal pressure sampling means is so comprised as to use as the sampling position at least either of a rotational angle position of the crankshaft matching a leading edge of the pulse signal generated by the signal generating device and a rotational angle position of the crankshaft matching a trailing edge of the pulse signal.

While each of the constructions described above uses a rotational angle sensor for generating rotational angle signals for determining the sampling positions of the pressure within the air intake pipe and a pulse generator for generating reference pulses, it is also possible to use a rotational angle sensor (encoder) for generating both rotational angle detection pulses for determining sampling positions and reference pulses. In this case, the rotational angle detection pulses and the reference pulses can be distinguished from each other by, for instance, differentiating them in pulse width.

The rotational angle detection pulses and the reference pulses can also be distinguished from each other by having the pulses generated at equal angular intervals recognized as rotational angle detection pulses and the pulses generated at unequal angular intervals recognized as reference pulses, while a series of pulses equal in pulse width, each being generated every time the internal combustion engine rotates by a predetermined minute angle, generates partly at unequal intervals.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIGS. 5A and 5B are a diagram of an example of variation in the pressure within the air intake pipe and a waveform diagram showing an example waveform variation of pulses to be supplied by the rotational angle sensor for use according to the invention; and FIG. 6 is a diagram showing pressure variations in the air intake pipe of a mono-cylinder internal combustion engine and pressure variations in a surge tank of a tri-cylinder internal combustion engine.

DETAILED DESCRIPTION OF PREFERRED EMBODIMENTS

A method and an apparatus for detecting operating state of internal combustion engines of the invention will be described with reference to the drawings just below.

Figure 1:
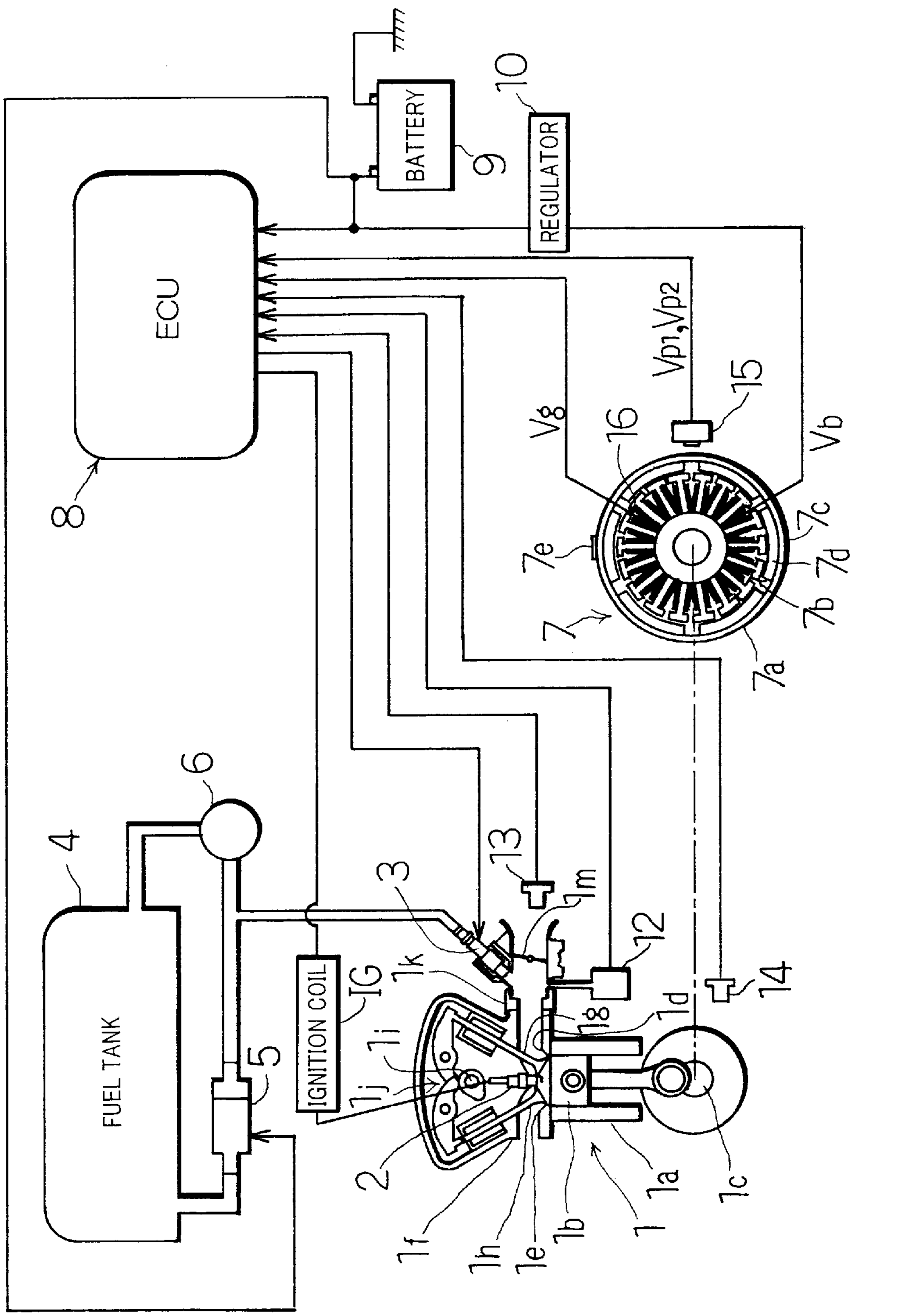
FIG. 1 illustrates the construction of an example of a control system for controlling an internal combustion engine using an ECU.

FIG. 1 illustrates the construction of an example of a control system for controlling an internal combustion engine using an ECU. An internal combustion engine 1 illustrated here is a mono-cylinder four-stroke engine, which comprises a cylinder 1*a,* a piston 1*b,* a crankshaft 1*c* connected to the piston 1*b* by a connecting rod, a cylinder head 1*f* having an intake port 1*d* and an exhaust port 1*e,* an intake valve 1*g* and an exhaust valve 1*h* for respectively opening/closing the intake port and the exhaust port, a cam shaft 1*i* driven by the crankshaft 1*c,* a valve drive mechanism 1*j* for driving the intake valve 1*g* and the exhaust valve 1*h* along with the revolution of the cam shaft 1*i,* and an air intake pipe 1*k* connected to the intake port 1*d.* A throttle valve 1*m* is provided within the air intake pipe 1*k.*

The cylinder head of the internal combustion engine 1 is fitted with an ignition plug 2, which is connected to a secondary coil of ignition coils IG by a high voltage cord.

The air intake pipe 1*k* of the internal combustion engine is fitted with an injector (electromagnetic fuel injection valve) 3. The illustrated injector 3 has a known construction provided with an injector body having a fuel injection port at its tip and a fuel feed port toward its rear end, a valve member provided to enable the fuel injection port to be displaced within the injector body between an opened position and a closed position, energizing means for energizing the valve member toward its closed position, and a solenoid for driving the valve member toward its closed position. While the solenoid is being fed with a drive current, the fuel injection port is opened to inject fuel into the air intake pipe of the internal combustion engine.

Reference numeral 4 denotes a fuel tank for storing fuel to be fed to the engine; 5 denotes an electric fuel pump for feeding the fuel in the fuel tank 4 to the injector 3; and 6 denotes a pressure regulator connected to a pipe that leads to the fuel feed port of the injector 3. The pressure regulator 6 regulates the fuel pressure to keep almost predetermined value by returning part of the fuel fed from the fuel pump 5 to the fuel tank 4 when the pressure of fuel fed to the injector 3 surpasses the predetermined value.

Since the pressure of fuel fed to the injector 3 is thereby kept substantially constant, the quantity of fuel injected by the injector 3 (fuel injection quantity) is determined by the length of time during which the injection port of the injector 3 is kept open. The duration of the open state of the injection port of the injector 3 is substantially determined by the length of time during which a drive current is fed to the injector 3. Therefore, when controlling the fuel injection quantity, the fuel injection quantity required by the engine is arithmetically operated according to various control conditions, the duration of injection to achieve the injection quantity is figured out, a drive current is fed to the injector during the duration of injection arithmetically operated when a predetermined injection timing is detected, and fuel is injected accordingly.

Reference numeral 7 denotes a magnet generator driven by the crankshaft 1*c* of the engine. The illustrated magnet generator comprises a magnet rotor 7*a* mounted on the crankshaft 1*c* and a stator 7*b* mounted on a case or the like of the engine. The illustrated magnet rotor 7*a* is comprised of a flywheel magnet rotor of a known construction. The rotor 7*a* is provided with a cup-shaped flywheel 7*c* mounted on the crankshaft 1*c* and a plurality of permanent magnets 7*d* fitted to the inner periphery of the flywheel. The stator 7*b* comprises a multipolar star-like core around which a large number of teeth are radially formed and a large number of power generating coils wound around the large number of teeth of the iron core. A polar portion at the tip of each of the teeth of the multipolar star-like core of the stator 7*b* is placed opposite to the polar portion of the magnet rotor 7*a* with a predetermined gap between them.

Reference numeral 8 denotes an ECU for controlling the quantity of fuel injected by the injector and the ignition timing of the engine, and 9 denotes a battery charged via a regulator 10 by an output voltage Vb of a battery charging power generating coil provided in the stator of the magnet generator 7. The output voltage of the battery 9 is fed to a power supply terminal of the electric fuel pump 5 and that of the ECU 8. Within the ECU 8, there is provided a power supply circuit for keeping the voltage of the battery at a constant level suitable for driving a microcomputer, and the output voltage of the power supply circuit is applied to the power supply terminal of the microcomputer.

Into the ECU 8, it is inputted outputs of various sensors for detecting control conditions for controlling the quantity of fuel injected by the injector 3 and control conditions for controlling the ignition timing of the engine.

In the illustrated example, there is provided a pressure sensor 12 for detecting the pressure within the air intake pipe 1*k*, an intake temperature sensor 13 for detecting the intake temperature of the engine, and a water temperature sensor 14 for detecting the temperature of engine cooling water, and the outputs of these sensors are entered into A/D input ports of the ECU 8.

To obtain information on engine rotation (rotational angle position information and rotational speed information), there is provided a pulse generator 15, whose output is entered into the ECU 8. The pulse generator 15, intended to generate pulses by detecting an edge of a reluctor 7*e* which is formed of a projection or a concave part on an outer periphery of the flywheel 7*c*, is comprised of, for instance, an iron core having at its tip a magnetic pole opposite to the reluctor 7*e*, a permanent magnet magnetically coupled to the iron core, and a signal coil wound around the iron core.

The pulse generator 15 generates paired pulses differing in polarity depending on whether a fore edge in the rotating direction of the reluctor 7*e* has been detected or a rear edge in the rotating direction of the reluctor 7*e* has been detected. One type of these paired pulses are used as reference pulses, and to the reference rotational angle position of the crankshaft (the position to be referenced in measuring the crank angle) of the engine is detected according to the reference pulses.

Figures 4A, 4B, 4C:
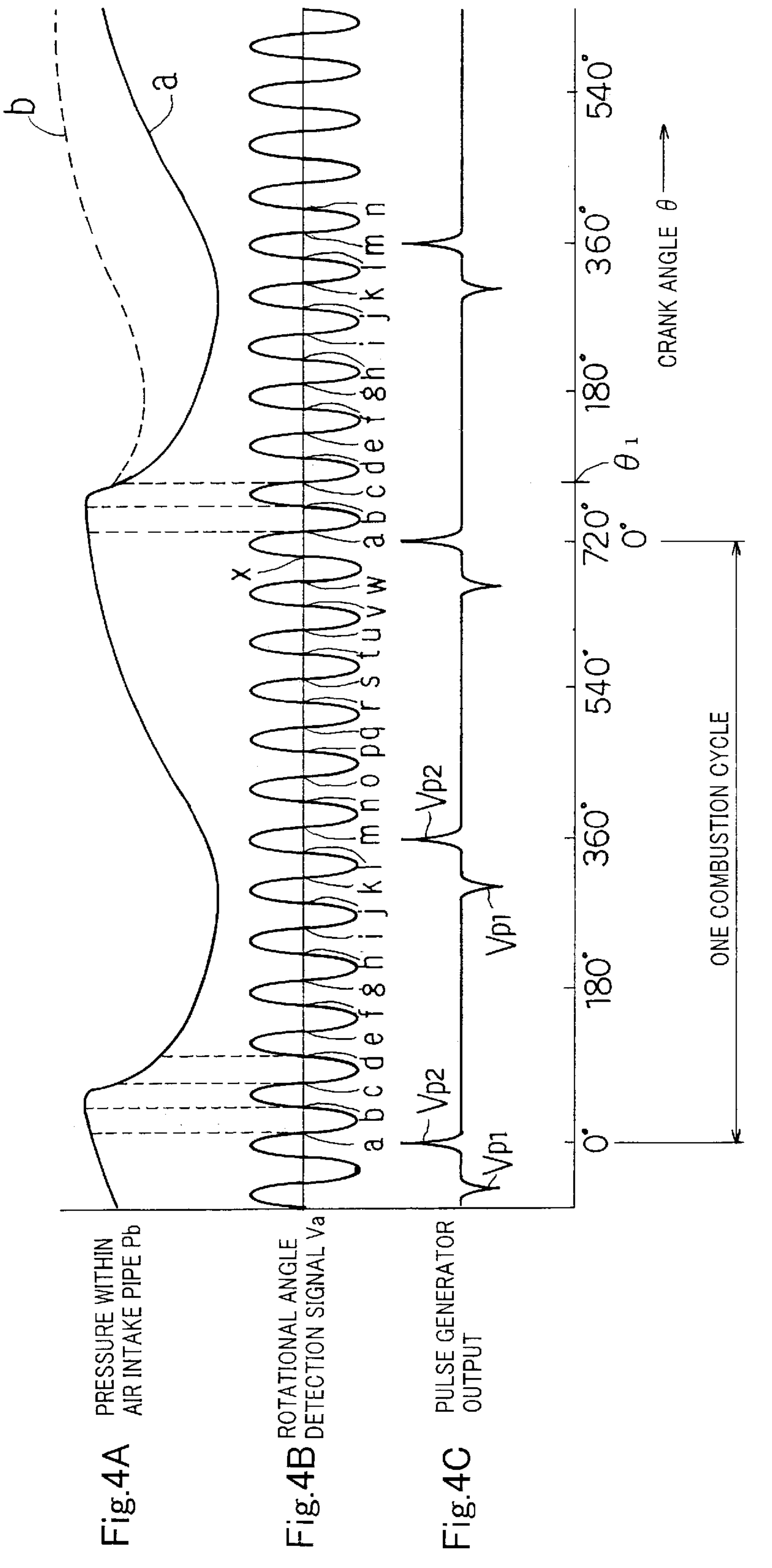
FIGS. 4A through 4C are a diagram showing variations in pressure within an air intake pipe of an engine, an output waveform of a rotational angle sensor and a waveform of reference pulses in a preferred embodiment of the invention.

In the illustrated example, as shown in FIG. 4C, when the pulse generator 15 detects the fore edge of the reluctor 7*e*, a negative pulse Vp1 is generated, and when it detects the rear edge of same, it generates a positive pulse Vp2. Of these pulses, the positive pulse Vp2 is used as a reference pulse. When the ECU 8 has recognized the generation of a reference pulse Vp2, the ECU 8 detects the coincidence of the rotational angle position of the crankshaft of the engine with the reference rotational angle position. Since the illustrated internal combustion engine is a four-stroke engine, two reference pulses Vp2 are generated per combustion cycle.

Further in the illustrated example, the power generating coil wound around one of teeth of the stator core of the magnet generator 7 is used as a rotational angle sensor 16, and the output voltage Vg of the power generating coil constituting this rotational angle sensor is inputted into the ECU 8.

Within the ECU 8, there are provided an injector drive circuit and a primary current control circuit for controlling the primary current of the ignition coils IG. The injector 3 and the primary coil of the ignition coils IG are respectively connected to the output terminal of the injector drive circuit and that of the primary current control circuit.

The ECU 8 together with the pulse generator 15, the rotational angle sensor 16 and the pressure sensor 12, serves as operating state detecting means constituting an operating state detecting apparatus for detecting the accelerating state and the decelerating state of the engine in addition to serving as various function realizing means such as rotational speed operating means, air intake quantity estimating means, injection quantity operating means, injection quantity correcting means, injection command generating means, ignition timing operating means and ignition signal generating means by causing a microcomputer to execute appropriate programs.

Figure 2:
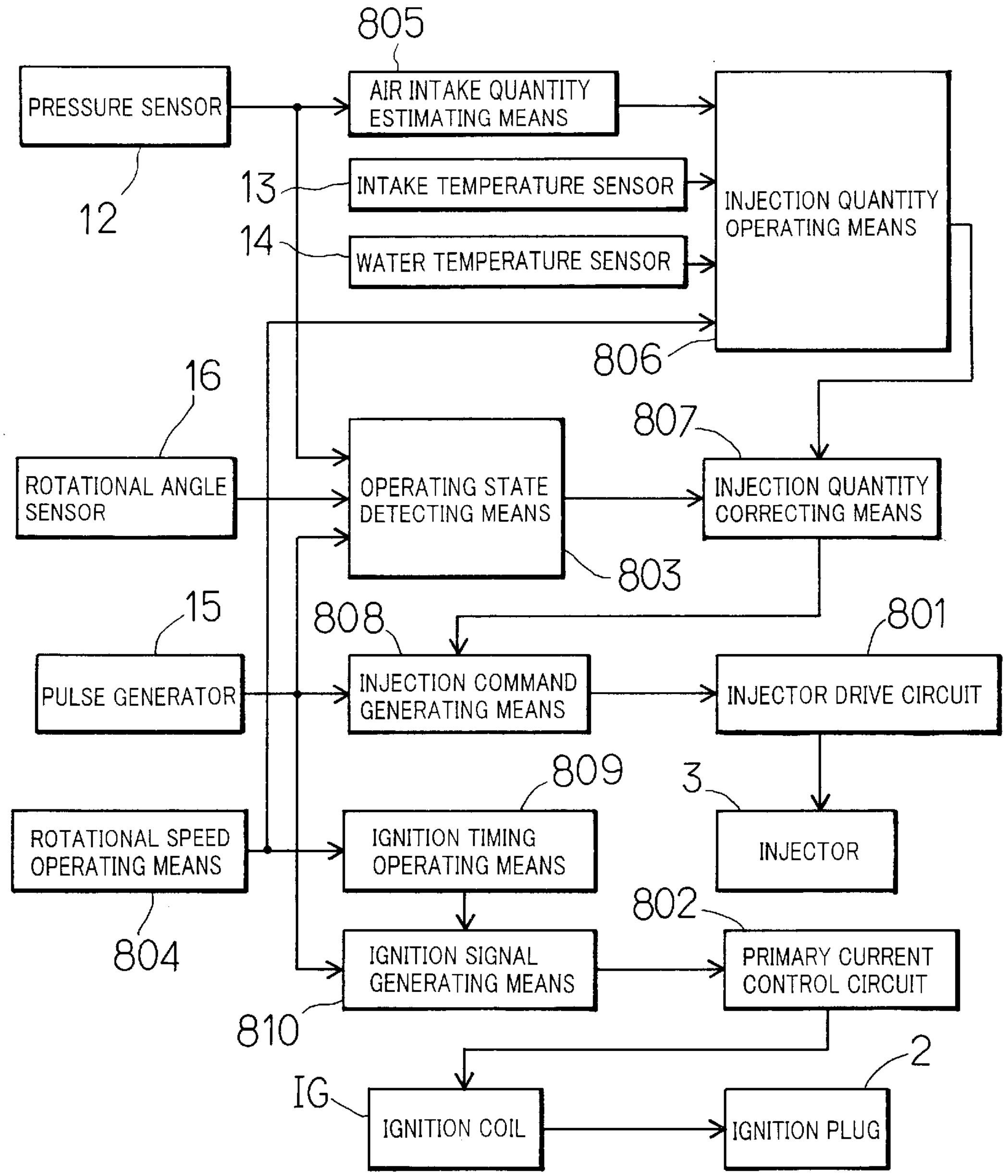
FIG. 2 is a block diagram of the example of control system illustrated in FIG. 1.

FIG. 2 is a block diagram illustrating a hardware construction of the system shown in FIG. 1 and a construction of means for performing a specific function composed by the microcomputer in the ECU 8 and programs executed by the microcomputer. In FIG. 2, an injector drive circuit 801 and a primary current control circuit 802 are provided in the ECU 8 as hardware circuits, while operating state detecting means 803, rotational speed operating means 804, air intake quantity estimating means 805, injection quantity operating means 806, injection quantity correcting means 807, injection command generating means 808, ignition timing operating means 809 and ignition signal generating means 810 are comprised by causing the microcomputer in the ECU 8 to execute respectively predetermined programs.

The construction of each section shown in FIG. 2 will be described below.

Figure 3:
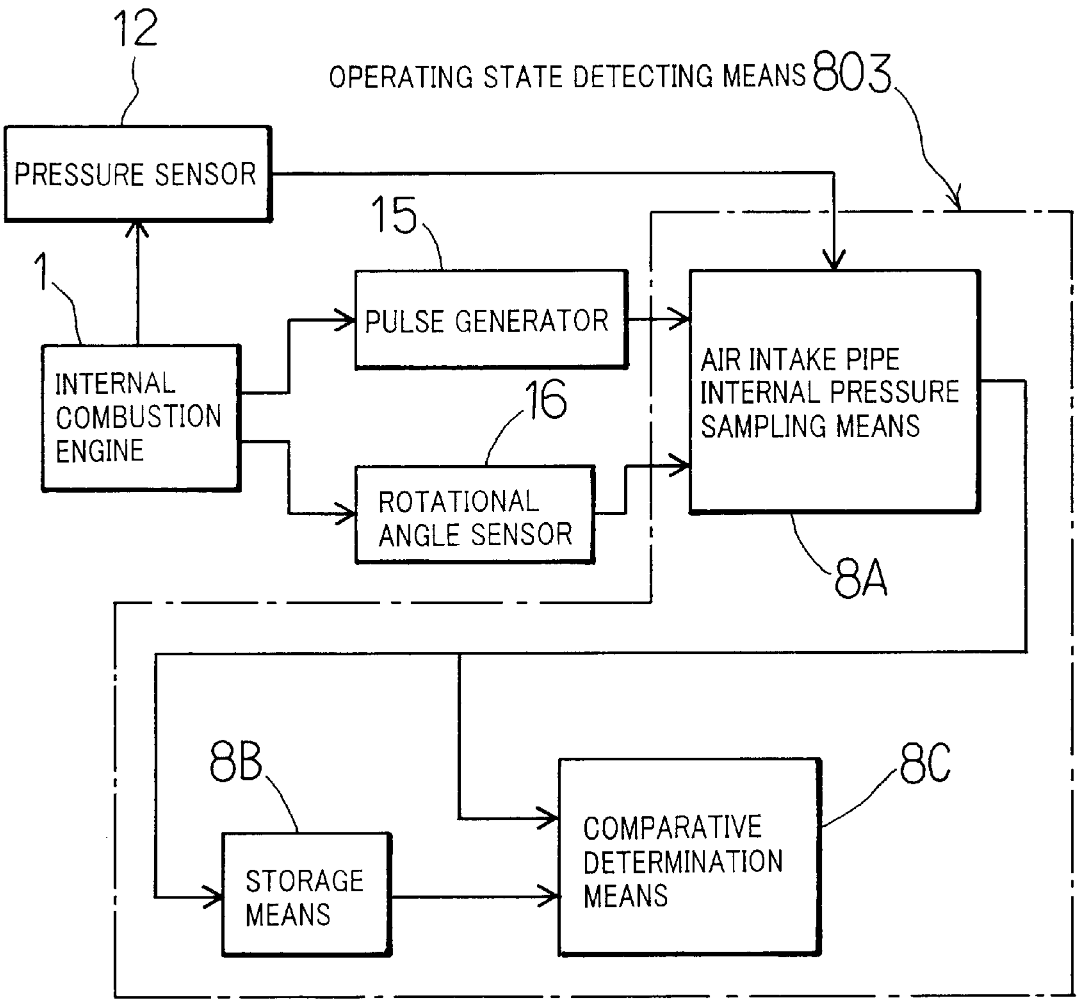
FIG. 3 is a block diagram of a typical construction of an operating state detecting apparatus according to the present invention.

First, the operating state detecting means 803 is intended to determine that an internal combustion engine is in any of set accelerating states, such as an abrupt accelerating state or in any of set decelerating states, such as an abrupt decelerating state, by using the operating state detecting method according to the invention. As illustrated in FIG. 3, it is comprised of air intake pipe internal pressure sampling means 8A, storage means 8B and comparative determination means 8C.

The air intake pipe internal pressure sampling means 8A samples an air intake pipe internal pressure Pb detected by a pressure sensor at each of the sampling positions, which are a plurality of rotational angle positions detected from rotational angle detection signals outputted by the rotational angle sensor 16.

In the example shown in FIG. 1, the rotational angle sensor 16 comprises a power generating coil provided in the magnet generator 7 as stated above and, as shown in FIG. 4B, outputs a rotational angle detection signal Va having a substantially sine wave shape with respect to a crank angle θ. In the illustrated example, six cycles of the rotational angle detection signal Va are generated per revolution of the crankshaft. Where such a sine wave-shaped rotational angle detection signal Va is used, information on a plurality of rotational angle positions of the crankshaft can be obtained by detecting the zero cross points and the peak points of the waveform. Here, 24 rotational angle positions a through x of the crankshaft matching 24 zero cross points emerging in the rotational angle detection signal Va during one combustion cycle (two revolutions of the crankshaft) are used as sampling positions of the pressure within the air intake pipe.

The storage means 8B specifies sampling positions with reference to the reference rotational angle position detected by the reference pulse Vp2 (see FIG. 4C) generated by the pulse generator 15, and stores into a RAM the pressures within the air intake pipe sampled at different sampling positions and the respective sampling positions. In the example shown in FIG. 4, the zero cross point of the rotational angle detection signal Va emerging immediately after the generation of the reference pulse Vp2 by the pulse generator 15 at the start of one combustion cycle is specified as sampling position a, and the zero cross points, each emerging during one of the successively following combustion cycles, are specified as sampling positions b, c, . . . , x. The pressures within the air intake pipe Pb sampled at these 24 sampling positions a, b, c, . . . , x are stored together with the respectively matching sampling positions.

The comparative determination means 8C compares, every time the pressure within the air intake pipe is newly sampled at a sampling position, the newly sampled pressure within the air intake pipe with the previous pressure within the air intake pipe sampled at the same sampling position one combustion cycle before and stored in the storage means 8B. If the newly sampled pressure within the air intake pipe is found higher by at least a predetermined level than the previously sampled pressure within the air intake pipe, the internal combustion engine is determined to be in an accelerating state or, if the newly sampled pressure within the air intake pipe is found lower by at least a predetermined level than the previously sampled pressure within the air intake pipe, the internal combustion engine is determined to be in a decelerating state.

A curve "a" represented in a solid line in FIG. 4A shows variations of the pressure within the air intake pipe Pb in a steady state in which a four-stroke internal combustion engine is running at a substantially constant rotational speed. By contrast, a curve b represented in a broken line shows variations of the pressure within the air intake pipe in an abruptly accelerating operation by opening the throttle valve in the position of a crank angle θ1. Thus, when the engine is being accelerated, as the opening of the throttle valve results in a pressure rise in the air intake pipe, it is possible to determine that the engine is in an accelerating state by detecting this pressure rise.

When the engine is in a decelerating state, contrary to the case represented by the broken line in FIG. 4A, the pressure within the air intake pipe drops below its level during steady operation, with the result that it is found that the pressure within the air intake pipe newly sampled at each sampling position is lower at least by a predetermined level than the previous pressure within the air intake pipe sampled at the same sampling position one combustion cycle before, which makes it possible to determine that the engine is in a decelerating state.

Thus, according to the operating state detecting method pertaining to the present invention, a plurality of rotational angle positions a, b, c, . . . of the crankshaft 1*c* of an internal combustion engine are designated in advance as sampling positions for sampling the pressure in the air intake pipe of the internal combustion engine, the pressure within the air intake pipe detected by the pressure sensor 12 at each sampling position is sampled, and the sampled pressure within the air intake pipe is stored into a RAM together with the sampling position. Then, every time the pressure within the air intake pipe is newly sampled at each sampling position, the newly sampled pressure within the air intake pipe is compared with the previous pressure within the air intake pipe sampled at the same sampling position one combustion cycle before. If the newly sampled pressure within the air intake pipe is found higher by at least a predetermined level than the previously sampled pressure within the air intake pipe, the internal combustion engine is determined to be in an accelerating state or, if the newly sampled pressure within the air intake pipe is found lower by at least a predetermined level than the previously sampled pressure within the air intake pipe, the internal combustion engine is determined to be in a decelerating state.

The degree of acceleration or of deceleration can be determined by the rate of variation over time of the difference between the newly sampled pressure within the air intake pipe and the previous pressure within the air intake pipe sampled at the same position.

In a mono-cylinder internal combustion engine, since the pressure within the air intake pipe Pb pulsates with respect to the crank angle θ as represented by the curve a in FIG. 6, it is not possible to determine whether the engine is in an accelerating state or a decelerating state by comparing the pressure within the air intake pipe at any given moment with the reference pressure. Similarly, in a multi-cylinder internal combustion engine of which each cylinder is provided with an air intake pipe having a throttle valve, since the pressure within the air intake pipe Pb pulsates with respect to the crank angle θ, it is not possible to determine whether the engine is in an accelerating state or a decelerating state by comparing the pressure within the air intake pipe at any given moment with the reference pressure.

By contrast, where variations in the pressure within the air intake pipe are detected, as according to the present invention, by comparing the pressure within the air intake pipe sampled at each sampling position with the previous pressure within the air intake pipe sampled at the same sampling position one combustion cycle before, it is made possible to eliminate the impact of the pulsation of the pressure within the air intake pipe, to accurately detect variations in the pressure within the air intake pipe along with engine acceleration or variations in the pressure within the air intake pipe along with engine deceleration, and thereby to correctly determine whether the engine is in an accelerating state or a decelerating state.

Incidentally, the curve b in FIG. 6 represents pressure variations in a surge tank of a tri-cylinder four-stroke internal combustion engine wherein a single air intake pipe links to the intake ports of the three cylinders via the surge tank. Since the pressure in the surge tank is relatively insusceptible to pulsation along with stroke changes of the engine, indirect detection of the pressure within the air intake pipe by way of the pressure in the surge tank makes relatively easy to detect variations in the pressure within the air intake pipe along with variations in the degree of throttle opening. However, even where the pressure within the air intake pipe is to be detected from the pressure in the surge tank, it is not possible to completely eliminate the impact of the pulsation due to the stroke changes of the engine, and therefore it is useful to use a method by which the pressure within the air intake pipe detected at each sampling position is compared with the pressure within the air intake pipe sampled one combustion cycle before as suggested by the present invention.

In the above-described instance, while the rotational angle positions detected according to the zero cross points of the rotational angle detection signal shown in FIG. 4B are used as sampling positions, it is also possible to use as sampling positions rotational angle positions according to the positive and negative peak points of the rotational angle detection signal, or to use both the zero cross points and the positive and negative peak points as sampling positions. If both zero cross points and peak points are used as sampling positions, the sampling intervals can be shortened, resulting in even finer detection of pressure variations in the air intake pipe for more accurate determination of an accelerating state or a decelerating state.

In the example described above, while the power generating coil in the magnet generator driven by the engine is used as the rotational angle sensor, it is also possible to use as the rotational angle sensor a signal generating device that generates a pulse signal every time the internal combustion engine rotates by a predetermined angle. In this case, the air intake pipe internal pressure sampling means is comprised so as to use as the sampling position at least either of the rotational angle position of the crankshaft matching the leading edge of each pulse signal generated by the signal generating device and the rotational angle position of the crankshaft matching the trailing edge of each pulse signal.

As the signal generating device generating a pulse every time the engine rotates by a predetermined angle, it is possible to use, for instance, a gear sensor which generates a pulse signal when it detects a tooth of a ring gear fitted to the outer periphery of a flywheel to engage a pinion gear driven by an engine starting motor. It is also possible to use as the rotational angle sensor a rotary encoder commonly used for detecting the rotational angle position of a rotating member.

Where an encoder is used as the rotational angle sensor, it is possible to cause the encoder to generate both rotational angle detection pulses and reference pulses. If the encoder is caused to generate both the rotational angle detection pulses and the reference pulses, a part of the generation intervals of a series of pulses is made unequal, each being generated every time the internal combustion engine rotates by a predetermined minute angle. Then, the pulses generated at equal angular intervals may be recognized as rotational angle detection pulses and the pulses generated at unequal angular intervals may be recognized as reference pulses.

It is also possible to differentiate the width of a series of pulses generated by the encoder every time the internal combustion engine rotates by a predetermined minute angle from that of other pulses, and the series of pulses equal in width may be recognized as rotational angle detection pulses, and the pulses differing in width from other pulses may be recognized as reference pulses.

FIG. 5B illustrates an example in which reference pulses and rotational angle detection pulses are generated from a single encoder. In this instance, a wide pulse Vp1 is generated only once per revolution of the crankshaft, and narrow pulses Vp2 are generated many times at short intervals, in which the wide pulses Vp1 are used as reference pulses and the narrow pulses Vp2 are used as rotational angle detection pulses. FIG. 5A shows similar variations of the pressure within the air intake pipe to those shown in FIG. 4A. The curve "a" represents the pressure within the air intake pipe in a steady state wherein the engine rotates at a substantially constant rotational speed, while the curve b represents the pressure within the air intake pipe in abrupt acceleration by opening the throttle valve.

Although each interval of sampling the pressure within the air intake pipe is supposed to be equal in the foregoing example, it may as well be unequal.

In this embodiment of the invention, an operating state detecting apparatus pertaining to the invention is comprised of the operating state detecting means 803, the pressure sensor 12, the pulse generator 15 and the rotational angle sensor 16 shown in FIG. 3.

Next, describing other function realizing means than the operating state detecting means realized by the ECU 8 in the control system illustrated in FIG. 1 and FIG. 2, the rotational speed operating means 804, provided for detecting the rotational speed of the internal combustion engine at each moment, arithmetically operates the rotational speed of the engine from the generation intervals of the pulses outputted by the pulse generator 15.

The air intake quantity estimating means 805, provided for estimating the quantity of air flowing into the cylinder, estimates the quantity of air flowing into the cylinder of the engine from the pressure within the air intake pipe detected by the pressure sensor 12 and the volume efficiency of the internal combustion engine.

The injection quantity operating means 806 arithmetically operates the fuel injection quantity according to various control conditions including the air intake quantity estimated by the air intake quantity estimating means 805, the intake temperature detected by the intake temperature sensor 13, the engine cooling water temperature detected by the water temperature sensor 14, and the engine rotational speed arithmetically operated by the rotational speed operating means 804. When arithmetically operating the injection quantity, other conditions including the atmospheric pressure than the illustrated ones may be added as control conditions.

The injection quantity correcting means 807 corrects upward the injection quantity arithmetically operated by the injection quantity operating means 806 when the operating state detecting means 803 reveals that the internal combustion engine is in one of set accelerating states (e.g. an abrupt accelerating state), or corrects downward the injection quantity arithmetically operated by the injection quantity operating means 806 when the engine is found to be in one of set decelerating states (e.g. an abrupt decelerating state). This correction is performed by, for instance, multiplying the injection quantity arithmetically operated by the injection quantity operating means 806 by a correction coefficient.

The injection quantity correcting means 807 may also correct upward the injection quantity when the engine temperature (cooling water temperature) is found too low at the time of starting the engine.

The injection command and generating means 808 arithmetically operates the required duration of injection for causing the injector to inject fuel in a quantity arithmetically operated by the injection quantity operating means 806 and corrected, as needed (when the engine is determined to be in an accelerating state or a decelerating state), by the injection quantity correcting means 807, and provides the injector drive circuit 801 with an injection command signal having a signal width matching the duration of injection arithmetically operated when a predetermined injection timing has been detected on the basis of rotational angle information obtained from the output of the pulse generator 15.

The injector drive circuit 801 gives a drive current to the injector 3 while the injection command signal is being generated, and thereby causes the injector to inject fuel.

The ignition timing operating means 809 arithmetically operates the ignition timing of the internal combustion engine according to the rotational speed arithmetically operated by the rotational speed operating means 804.

The ignition signal generating means 810, when for instance the pulse generator 15 has generated a specific pulse, starts detection of the ignition timing arithmetically operated by the ignition timing operating means, and gives an ignition signal to the primary current control circuit 802 when the arithmetically operated ignition timing for the engine is detected.

The primary current control circuit 802, when the ignition signal has been given, causes an abrupt variation in the primary current of the ignition coils IG to induce a high voltage for ignition use in the secondary coil of the ignition coils. As this high voltage for ignition use is applied to the ignition plug 2, a spark discharge arises in an ignition plug 2 to ignite the engine.

Although the foregoing description supposes that both an accelerating state and a decelerating state of the internal combustion engine are detected in order to correct the fuel injection quantity of the engine during acceleration and deceleration, either an accelerating state or a decelerating state, not both, may be detected depending on the purpose of detecting the operating state.

While the foregoing description referred to a four-stroke internal combustion engine, the invention can as well be applied to a two-stroke internal combustion engine.

As aforementioned, the present invention makes it possible to determine whether an internal combustion engine is in an accelerating state and/or whether it is in a decelerating state by specifying in advance a plurality of rotational angle positions of the crankshaft of an internal combustion engine as sampling positions for sampling the pressure within the air intake pipe of the internal combustion engine, and comparing, every time the pressure within the air intake pipe is sampled at a sampling position, the newly sampled pressure within the air intake pipe with the previous pressure within the air intake pipe sampled at the same sampling position one combustion cycle before. As a result, it is made possible to detect whether an engine is in an accelerating state and/or whether it is in a decelerating state without having a throttle position sensor, and thereby to reduce the cost.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. An operating state detecting method for an internal combustion engine for determining whether the internal combustion engine is being accelerated and/or whether it is being decelerated, comprising:

a step of, in the state where a plurality of rotational angle positions of a crankshaft of said internal combustion engine are predetermined in advance to be sampling positions for sampling pressures within an air intake pipe of said internal combustion engine, storing each pressure within the air intake pipe of said internal combustion engine sampled at each sampling position; and a step of comparing, every time each pressure within the air intake pipe is sampled at each sampling position, a newly sampled pressure within the air intake pipe with a previous pressure within the air intake pipe sampled at the same sampling position one combustion cycle before, and determining from the result of comparison whether said internal combustion engine is in an accelerating state and/or whether it is in a decelerating state.

2. An operating state detecting method for an internal combustion engine for determining whether the internal combustion engine is being accelerated and/or whether it is being decelerated, comprising:

a step of, in the state where a plurality of rotational angle positions of a crankshaft of said internal combustion engine are predetermined in advance to be sampling positions for sampling pressures within an air intake pipe of said internal combustion engine, storing each pressure within the air intake pipe of said internal combustion engine sampled at each sampling position;

a step of comparing, every time each pressure within the air intake pipe is sampled at each sampling position, a newly sampled pressure within the air intake pipe with a previous pressure within the air intake pipe sampled at the same sampling position one combustion cycle before, and a step of determining that said internal combustion engine is being accelerated when the newly sampled pressure within the air intake pipe is higher by at least a predetermined level than the previously sampled pressure within the air intake pipe, and determining that said internal combustion engine is being decelerated when the newly sampled pressure within the air intake pipe is lower by at least a predetermined level than the previously sampled pressure within the air intake pipe.

3. An operating state detecting apparatus for an internal combustion engine for determining whether the internal combustion engine is being accelerated and/or whether it is being decelerated, comprising:

a pressure sensor for detecting pressures within an air intake pipe of the internal combustion engine, a rotational angle sensor for generating a rotational angle detection signal for detecting each of a plurality of rotational angle positions of a crankshaft of said internal combustion engine, a pulse generator for generating a reference pulse for detecting a reference rotational angle position of the crankshaft of the internal combustion engine, air intake pipe internal pressure sampling means for sampling, at each of the plurality of rotational angle positions detected from said rotational angle detection signal as sampling positions, the pressure within the air intake pipe detected by said pressure sensor at each sampling position, storage means for identifying said sampling positions with reference to the reference rotational angle position detected by said reference pulses and storing the pressures within the air intake pipe sampled at different sampling positions, and comparative determination means for comparing pressures within the air intake pipe newly sampled at each sampling position with pressures within the air intake pipe sampled at the same sampling position one combustion cycle before and stored by said storage means, determining that said internal combustion engine is being accelerated when the newly sampled pressure within the air intake pipe is higher by at least a predetermined level than the previously sampled pressure within the air intake pipe, and determining that said internal combustion engine is being decelerated when the newly sampled pressure within the air intake pipe is lower by at least a predetermined level than the previously sampled pressure within the air intake pipe.

4. An operating state detecting apparatus for an internal combustion engine as set forth in claim 3, wherein said rotational angle sensor comprising a power generating coil provided in a multi-polar magnet generator driven by said internal combustion engine and supplying A.C. voltages of a plurality of cycles while the crankshaft of the internal combustion engine completes one revolution, and said air intake pipe internal pressure sampling means is so comprised as to use as said sampling position at least either of a rotational angle position of the crankshaft matching each zero cross point of the A.C. voltages supplied by said power generating coil and a rotational angle position of the crankshaft matching each peak point of the A.C. voltages.

5. An operating state detecting apparatus for an internal combustion engine, as set forth in claim 3, wherein said rotational angle sensor comprising a signal generating device for generating a pulse signal every time said internal combustion engine rotates by a predetermined angle, and said air intake pipe internal pressure sampling means is so comprised as to use as said sampling position at least either of a rotational angle position of the crankshaft matching a leading edge of the pulse signal generated by said signal generating device and a rotational angle position of the crankshaft matching a trailing edge of the pulse signal.

6. An operating state detecting apparatus for an internal combustion engine for determining whether the internal combustion engine is being accelerated and/or whether it is being decelerated, comprising:

a pressure sensor for detecting pressures within an air intake pipe of the internal combustion engine, a rotational angle sensor for generating a reference pulse signal for detecting a reference rotational angle position of a crankshaft of said internal combustion engine and a plurality of rotational angle detection pulses for detecting a plurality of rotational angle positions other than said reference rotational angle position, air intake pipe internal pressure sampling means for sampling, at each of said plurality of rotational angle positions as sampling positions detected with said plurality of rotational angle detection pulses, a pressure within the air intake pipe detected by said pressure sensor at each sampling position, storage means for identifying said sampling positions with reference to the reference rotational angle position detected with said reference pulses and storing the pressures within the air intake pipe sampled at different sampling positions, and comparative determination means for comparing a pressure within the air intake pipe newly sampled at each sampling position with a pressure within the air intake pipe sampled at the same sampling position one combustion cycle before, determining that said internal combustion engine is being accelerated when the newly sampled pressure within the air intake pipe is higher than the previously sampled pressure within the air intake pipe, and determining that said internal combustion engine is being decelerated when the newly sampled pressure within the air intake pipe is lower than the previously sampled pressure within the air intake pipe.

* * * * *